Sept. 5, 1944.  A. W. TONDREAU ET AL  2,357,707

FILM GATE PRESSURE PAD

Filed Aug. 2, 1941

FRED W. GAGE,
ALBERT W. TONDREAU,
INVENTORS

BY Orl R Horshaw
ATTORNEY.

Patented Sept. 5, 1944

2,357,707

UNITED STATES PATENT OFFICE 2,357,707

FILM GATE PRESSURE PAD

Albert W. Tondreau, Hollywood, and Fred W. Gage, Beverly Hills, Calif., assignors to Warner Bros. Pictures, Inc., a corporation of Delaware Application August 2, 1941, Serial No. 405,230

2 Claims. (Cl. 88—17)

This invention relates to motion picture apparatus and particularly to a mechanism for maintaining a plurality of films in contact at a light exposure point.

In the art of motion picture production it frequently is necessary to simultaneously expose two motion picture films at a light aperture in a camera. For instance, in the photographing of pictures in color, it is necessary in some methods that two negatives be simultaneously exposed to the scene being photographed. In a color separation process wherein a dyed background film is employed, the negative and background films are passed through the picture camera simultaneously during the photographing of the foreground action. The passage of two films in contact through motion picture film printers is well known wherein a negative is printed to a positive at the light exposure point.

For the above-mentioned apparatus to function satisfactorily it is necessary that the two films be in contact with one another at all points over their entire surfaces positioned at the exposing aperture; otherwise, blurring occurs at any point of separation, resulting in a lack of the desired image sharpness. Due to the natural tendency of motion picture films to warp and not remain flat since one side is coated with an emulsion, and because the two films are brought together from different angles, there is a tendency for air pockets to form between the films at the exposure point. The present invention is a device for simply and effectively preventing air from becoming entrapped between films at the exposure aperture by bringing the films together in small graduated steps, thus permitting the air to be expelled as the films are brought together. The films are also maintained substantially flat at the exposing point.

The principal object of the invention, therefore, is to facilitate the bringing together of two films in contact over a considerable surface thereof.

Another object of the invention is to provide a pressure pad for a plurality of films which maintains the films in contact at all points over their surfaces being exposed.

A further object of the invention is to provide a pressure pad for a plurality of films which prevents the entrapment of air between the films at an exposure point.

Although the novel features which are believed to be characteristic of this invention will be pointed out with particularity in the appended claims, the manner of its organization and the mode of its operation will be better understood by referring to the following description read in conjunction with the accompanying drawing forming a part thereof, in which Fig. 1 is a partial cross-sectional view of a motion picture camera embodying the invention;

Figure 1:
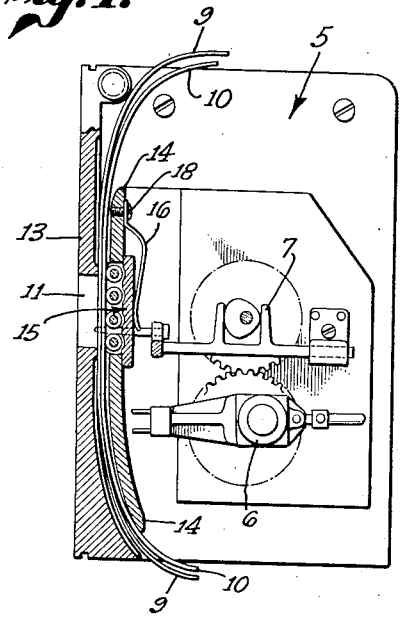

Referring now to Fig. 1, a portion of the interior of a camera 5 shows diagrammatically a pulldown mechanism 6 and a pilot pin mechanism 7 for advancing and maintaining, respectively, a pair of films 9 and 10 at the exposure aperture 11. The films 9 and 10 are taken from reels (not shown) and passed between the front guide plate 13 and the shoe 14 and are taken up by reels (not shown). Any standard type of camera pulldown and feed mechanisms may be used, one such type being shown in U. S. Patent 1,927,887 of September 26, 1933.

Figure 3:
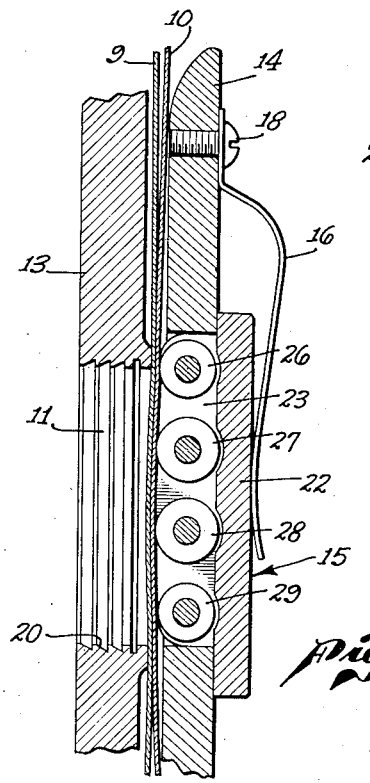
Fig. 3 is an enlarged cross-sectional view of the pressure pad in position in the camera aperture.

Located at the aperture 11 is a pressure pad assembly 15 resiliently maintained in position by a spring 16 mounted to the shoe 14 by a screw 18 (see Fig. 3). The internal surface of the opening in the plate 13 is shown corrugated at 20 to diffuse the light striking thereon and to prevent its reflection to the films.

Figure 2:
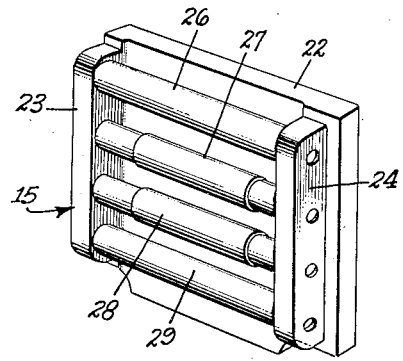
Fig. 2 is a perspective view of the pressure pad.
Figure 4:
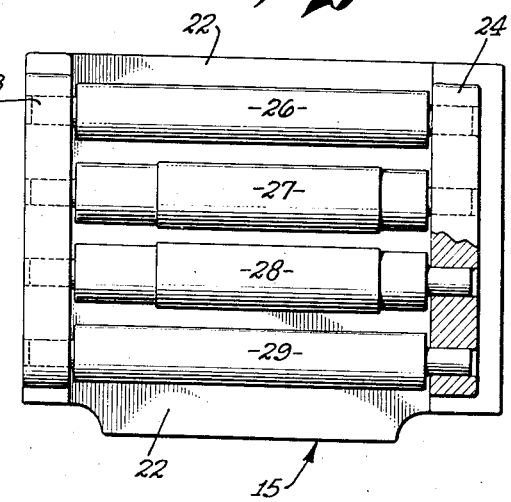
Fig. 4 is a plan view of the pressure pad.

Referring now to the remaining figures, the pressure pad is constructed of a flat rear plate 22 to which is suitably attached a pair of side runners 23 and 24 which have rotatably mounted therein the ends of four rollers 26, 27, 28 and 29. The runners 23 and 24 bear upon the edges of the film externally of the sprocket holes, these portions of the film also being in contact with the sides of the aperture formed in the plate 13. In the aperture space, however, the rear film 10 is in contact with the four rollers. It will be noted from Fig. 3 that the middle rollers 27 and 28 have a larger diameter through their central portions than the outside rollers 26 and 29, which have uniform diameters throughout their length, while in Figs. 2 and 4 it is shown that the ends of the rollers 27 and 28 have been reduced in diameter for clearing the sound track and sprocket hole portions of the film. The larger diameter portions of the rollers 27 and 28, therefore, extend over the picture areas of the films.

In one embodiment of the invention for use with standard 35 mm. motion picture film the two outside rollers 26 and 29 have a diameter of .142 inch, while the larger diameter of the rollers 27 and 28 are .1435 inch, the reduced portion of the rollers 27 and 28 having a diameter of .130 inch. This differential in diameters over the picture portion of the films was found not only to effectively expel all air and prevent air from becoming entrapped between the films 9 and 10, but to maintain the films in a substantially flat plane at the exposure aperture. It is realized that this problem has confronted others, a prior solution being the use of tapered rollers, such as those shown in the above-identified U. S. patent. However, tapered rollers do not maintain the film in as flat a plane as do uniform diameter rollers, the latter enabling improved image sharpness to be obtained on the emulsions of both films. The present invention thus improves image sharpness while securing perfect contact between the films at all points in the exposing aperture. The pad is held resiliently in contact with the films by the spring 16, thus permitting the pad to accommodate itself to the films as they are intermittently advanced past the aperture.

The diameter differential between the outside and middle rollers also relieves film tension at the lower roller during the pulldown action since this tension is equally divided between the lower two rollers 28 and 29 during this operation. The two upper rollers guide the film to the aperture in the same manner so that when the films come to rest, a slightly greater pressure is exerted against the films at the central portion than at the upper and lower edges of the aperture, the air being forced upwardly or downwardly if any should become entrapped due to warped film. The cylindrical construction of all the rollers holds the film in a transverse plane instead of in a curve as with tapered or crowned rollers. In the use of the above-described film gate in color photography and for color separation process shots, very satisfactory results have been obtained.

We claim as our invention:

1. A motion picture film camera pressure pad comprising a base plate, roller supporting means supported by said plate, and a plurality of right cylindrical rollers having their axes parallel disposed in a common plane for bearing upon the surface of a film, said rollers being mounted for rotation in said roller supporting means, the first and last rollers contacting the film throughout the entire transverse dimension of said film and being of a smaller diameter than the largest diameter of the rollers positioned intermediate said first and last rollers to bend said film only in its longitudinal direction, said intermediate rollers each having an enlarged right cylindrical portion intermediate the ends thereof contacting said film for only a portion of its transverse dimension, the larger diameter of each of said intermediate rollers exceeding the diameter of each of said first and last rollers by an amount of the order of .0015 inch.

2. A motion picture camera film gate for use with a plurality of films comprising a front wall member having an aperture therein, means for advancing said films past said aperture, and a backing pad resiliently held against the back film of said films, said backing pad having a plurality of right cylindrical rollers having their axes parallel disposed in a common plane opposite said aperture and turning in engagement with the back film of said films and holding said films in close engagement, the first and last rollers contacting said film throughout the entire transverse dimension of said film and having the same uniform diameter longitudinally of said rollers and being of a diameter smaller by the order of .0015 inch than the largest diameter of the rollers intermediate said first and last rollers, said intermediate rollers each having an enlarged right cylindrical portion intermediate the ends thereof in engagement with said back film for only a portion of its transverse dimension, said backing pad bending said films only in the direction of advancement of said film.

ALBERT W. TONDREAU.
FRED W. GAGE.